United States Patent [19]
Holbus

[11] Patent Number: 6,067,685
[45] Date of Patent: May 30, 2000

[54] VEHICLE WASHING STRIP

[76] Inventor: Edward Holbus, 1822 South St., Racine, Wis. 53404

[21] Appl. No.: 09/252,405

[22] Filed: Feb. 18, 1999

[51] Int. Cl.⁷ ....................................................... B60S 3/04
[52] U.S. Cl. .......................... 15/230.15; 15/208; 15/230; 15/230.16; 15/97.3; 15/DIG. 2
[58] Field of Search ..................................... 15/208, 209.1, 15/210.1, 222, 228, 230, 230.15, 230.16, 97.3, DIG. 2, 244.3

[56] References Cited

U.S. PATENT DOCUMENTS 4,852,199  8/1989  Holbus ........................................ 15/97.3
5,249,325  10/1993  Wilen ...................................... 15/230 X Primary Examiner—Mark Spisich
Attorney, Agent, or Firm—Quarles & Brady LLP

[57] ABSTRACT

A vehicle washing strip is formed of a length of a semi-rigid core material such as a felt of polypropylene, polyester, or other synthetic fiber. The core is surrounded by a cover of a cotton containing pile fabric, such as a cotton terry cloth. The cover is stitched to the core.

1 Claim, 1 Drawing Sheet

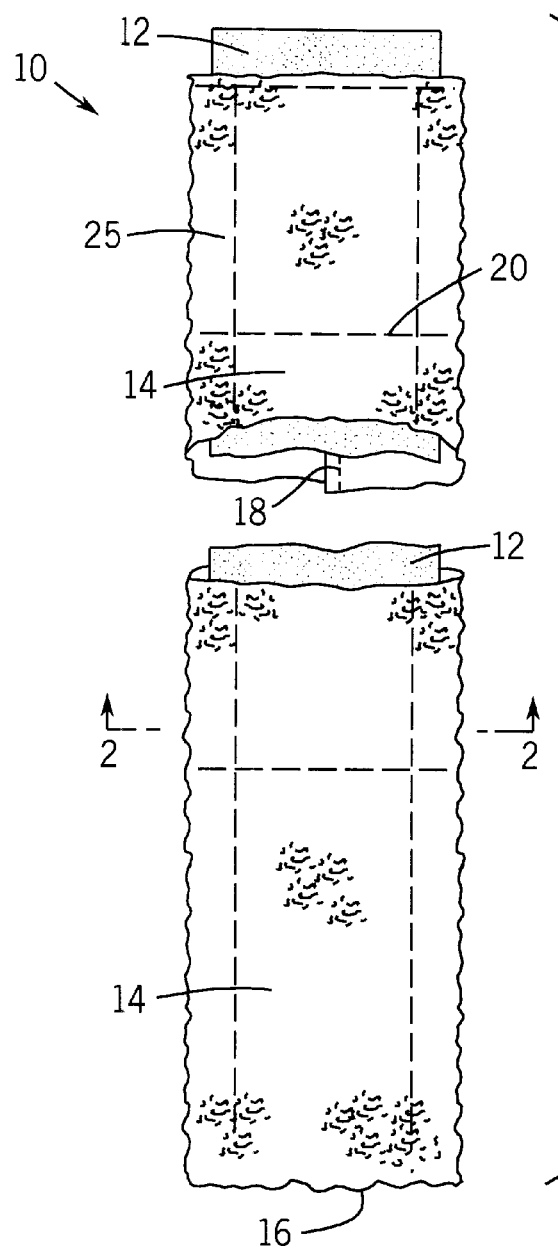
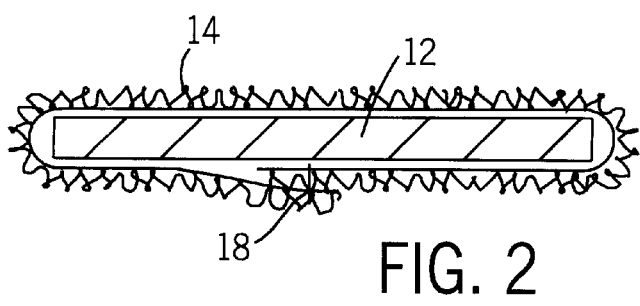

VEHICLE WASHING STRIP

BACKGROUND OF THE INVENTION

This invention relates to vehicle washing, and particularly to an improved flexible and wettable washing strip for washing the exterior of an automobile or other similar vehicle.

Automatic vehicle washing installations are well known. The installations typically take one of two general forms. In one form, an automobile is moved by a conveyor through successive stations at which various washing operations take place, such as wetting, scrubbing, and rinsing. The second approach is to automatically perform these same operations upon a stationary vehicle. In both forms, it is now common for the vehicle surface to be contacted by strips of fabric, either woven or felted. The strips are wetted with water and spread detergent or other chemicals over the surface of the vehicle to clean the surface. The strips are either suspended from a framework or are attached to a mandrel to act similar to bristles of a brush when the mandrel is rotated.

One possible arrangement for vehicle washing using strips is shown in my earlier U.S. Pat. No. 4,852,199 issued Aug. 1, 1989, for "Automatic Vehicle Washing Apparatus". In that patent, the strips are in the form of sponge-like elements comprised of a central stiffening member surrounded by a fiber batting and held in place by a woven outer tube. This assembly is stitched together at spaced locations along its length to form a series of sponge-like elements.

SUMMARY OF THE INVENTION

In accordance with the invention, a flexible and wettable washing strip is formed of a semi-rigid core of a felted fiber material surrounded by a cover formed of a cotton containing pile fabric. The core is preferably a polypropylene felt and the cover is a terry formed of all cotton or a cotton blend. Preferably, the cover is also formed as a boot that is slipped over the core and secured by transverse stitching at spaced locations.

The cotton containing pile fabric cover does an excellent job of washing a vehicle surface. The core provides the dimensional stability which the cover lacks.

Although the washing strip of the invention is particularly useful in automatic vehicle washing apparatus, it can be adapted for use as an implement in hand washing of a vehicle.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 1 is a view in elevation, with portions broken away, of a washing strip according to the invention; and FIG. 2 is an enlarged view in cross-section taken in the plane of the line 2—2 of FIG. 1.

DETAILED DESCRIPTION OF THE PREFERRED EMBODIMENT

A strip designated generally by the numeral 10 has a central core 12 formed from a semi-rigid but flexible felted fiber material. The preferred material is a felt polypropylene or polyester, such as that used in indoor-outdoor carpeting. Such materials exhibit excellent dimensional stability and, while wettable, the materials will absorb and not absorb water. A cover 14 surrounds the core 12. The cover 14 is formed of a cotton containing pile fabric. The preferred material is a 100% cotton or cotton blend terry cloth. The cover 14 is formed into a boot by stitching along the bottom seam 16 and along a longitudinal seam 18. The boot so formed is slipped over the core 12. The cover 14 is secured to the core 12 by stitches 20 running transverse to the length of the washing strip 10 at spaced intervals along its length. The stitching 20 passes through the cover and the core 12. Similar stitching 22 may be applied longitudinally along the length of the strip 10 adjacent the lateral edges. Alternately, the longitudinal seam 18 may be combined with stitching that passes through both the cover 14 and the core 12.

In use, the upper end of the core 12 is attached to a frame and suspended in the path of a vehicle surface together with a plurality of the strips 10. Alternately, the strip 10 can be attached at its upper end to a mandrel which rotates and directs an array of the strips 10 over the surface of the vehicle as it is rotated.

The terry cover 14 provides an excellent material for washing and cleaning a vehicle surface. It does not abrade the surface as do other materials. The cover 14 can be self-cleaning. The core 12 provides dimensional stability to the cover 14.

A second terry cover, or more, may be placed over the first cover and secured by stitching.

I claim:

1. A flexible and wettable washing strip to a vehicle washing apparatus, comprising:

an elongated semi-rigid core of a felted fiber material; and a cover formed of a cotton containing pile fabric surrounding the core, said cover defining a pocket in which said core is received, said cover being stitched to the core at spaced locations on the core, said stitching being at least one of the group consisting of stitching transverse to the longitudinal length of the core and stitching along the longitudinal length of the core.

\* \* \* \* \*